United States Patent
Kang

(10) Patent No.: US 11,941,981 B2
(45) Date of Patent: Mar. 26, 2024

(54) OBSTACLE DETECTION SYSTEM AND METHOD OF VEHICLE

(71) Applicant: HYUNDAI MOBIS Co., Ltd., Seoul (KR)

(72) Inventor: Eun Seok Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/881,119

(22) Filed: Aug. 4, 2022

(65) Prior Publication Data

US 2023/0038093 A1  Feb. 9, 2023

(30) Foreign Application Priority Data

Aug. 5, 2021  (KR) .................... 10-2021-0103347

(51) Int. Cl.
*G08G 1/0967* (2006.01)
*B60Q 9/00* (2006.01)

(52) U.S. Cl.
CPC ....... *G08G 1/096766* (2013.01); *B60Q 9/008* (2013.01)

(58) Field of Classification Search
CPC ............................ G08G 1/096766; B60Q 9/00
USPC .......................................................... 340/436
See application file for complete search history.

(56) References Cited

U.S. PATENT DOCUMENTS

| | | | | |
|---|---|---|---|---|
| 5,940,011 A * | 8/1999 | Agravante | ........... | H01Q 1/3233 340/901 |
| 9,775,004 B2 * | 9/2017 | Cawse | ................. | G08G 1/0112 |
| 2005/0015203 A1 * | 1/2005 | Nishira | ................. | B60W 50/16 340/436 |
| 2007/0010938 A1 * | 1/2007 | Kubota | .................. | B60Q 9/008 701/532 |
| 2010/0315214 A1 * | 12/2010 | Yano | ........................ | G06T 11/00 348/148 |
| 2015/0127249 A1 * | 5/2015 | Strau | .................... | G08G 1/0112 701/439 |
| 2015/0362326 A1 * | 12/2015 | Fujimoto | ............... | G01C 21/30 701/428 |
| 2017/0018189 A1 * | 1/2017 | Ishikawa | ........... | B60W 60/0053 |
| 2017/0291608 A1 * | 10/2017 | Engel | ..................... | G08G 1/161 |
| 2018/0113200 A1 * | 4/2018 | Steinberg | ............. | B60Q 1/0023 |
| 2018/0188059 A1 * | 7/2018 | Wheeler | ............... | G06V 10/457 |
| 2018/0354518 A1 * | 12/2018 | Inou | ................ | B60W 60/00272 |

(Continued)

FOREIGN PATENT DOCUMENTS

KR    10-2020-0065618 A    6/2020

*Primary Examiner* — Kerri L McNally
*Assistant Examiner* — Thang D Tran
(74) *Attorney, Agent, or Firm* — Morgan, Lewis & Bockius LLP

(57) ABSTRACT

Disclosed is an obstacle detection system of a vehicle. The obstacle detection system includes a driving information unit configured to calculate driving position information of the vehicle, a determiner configured to anticipate whether or not the vehicle will enter a joining point where the vehicle meets a target road to be joined based on the driving position information calculated by the driving information unit, a sensing unit configured to sense obstacles located beside the vehicle, and a controller configured to change a sensing range of the sensing unit so as to detect an obstacle moving on the target road to be joined, when the determiner anticipates that the vehicle will enter the joining point.

13 Claims, 6 Drawing Sheets

(56) References Cited

U.S. PATENT DOCUMENTS

| | | | |
|---|---|---|---|
| 2019/0202451 A1* | 7/2019 | Hayamizu | B60W 10/18 |
| 2019/0248279 A1* | 8/2019 | Takii | B60Q 1/507 |
| 2019/0256083 A1* | 8/2019 | Kang | B60W 30/0956 |
| 2019/0263418 A1* | 8/2019 | Lee | G01C 21/3691 |
| 2019/0359214 A1* | 11/2019 | Max | G06V 20/58 |
| 2020/0098266 A1* | 3/2020 | Tanaka | B60R 21/00 |
| 2020/0100120 A1* | 3/2020 | Oyabu | G08G 1/0112 |
| 2020/0225678 A1* | 7/2020 | Lee | G05D 1/0223 |
| 2020/0247412 A1* | 8/2020 | Wang | B60W 50/14 |
| 2020/0286385 A1* | 9/2020 | Wakayanagi | G08G 1/166 |
| 2020/0349216 A1* | 11/2020 | Das Sarma | G06F 9/30014 |
| 2020/0353863 A1* | 11/2020 | Weksler | B60W 50/14 |
| 2020/0369281 A1* | 11/2020 | Sato | B60W 30/143 |
| 2021/0009161 A1* | 1/2021 | Kim | G01C 21/34 |
| 2021/0207971 A1* | 7/2021 | Kim | G06V 20/597 |
| 2021/0223790 A1* | 7/2021 | Park | G05D 1/0219 |
| 2021/0256849 A1* | 8/2021 | Peranadam | H04W 64/006 |
| 2021/0271259 A1* | 9/2021 | Karpathy | G05D 1/0246 |
| 2021/0284165 A1* | 9/2021 | Yu | G06V 20/588 |
| 2021/0323574 A1* | 10/2021 | Yoo | G06T 7/70 |
| 2021/0343148 A1* | 11/2021 | Lee | H04W 4/46 |
| 2021/0394779 A1* | 12/2021 | Okada | G06V 10/62 |
| 2022/0363257 A1* | 11/2022 | Temel | B60W 10/18 |
| 2023/0184555 A1* | 6/2023 | Iihoshi | G01C 21/3848 |
| | | | 701/408 |

\* cited by examiner

OBSTACLE DETECTION SYSTEM AND METHOD OF VEHICLE

CROSS-REFERENCE TO RELATED APPLICATION

This application claims priority from Korean Patent Application No. 10-2021-0103347, filed on Aug. 5, 2021, in the Korean Intellectual Property Office, the disclosure of which is incorporated herein by reference in its entirety.

BACKGROUND OF THE DISCLOSURE

1. Field of the Disclosure

The present disclosure relates to an obstacle detection system and method of a vehicle, and more particularly, to technology that detects an obstacle moving on a target road to be joined by the driving road of a vehicle when the vehicle driving on the driving road is anticipated to enter the target road to be joined.

2. Description of the Related Art

In an entry section, such as a joining section of an expressway, a driver needs to continue to monitor vehicles entering from a target road to be joined so as to prevent collision with other vehicles.

Conventionally, the driver of the vehicle turns his/her head to grasp obstacles on the target road to be joined or grasps obstacles on the target road to be joined through side mirrors, the driver cannot keep eyes forward for a designated time when the driver turns his/her head and thus an accident occurs, and the driver cannot accurately grasp the obstacles on the target road to be joined through the side mirrors of the vehicle when an angle of entry into the target road to be joined is large.

The above information disclosed in the Background section is only for enhancement of understanding of the background of the disclosure and should not be interpreted as conventional technology that is already known to those skilled in the art.

SUMMARY OF THE DISCLOSURE

Therefore, the present disclosure has been made in view of the above problems, and it is an object of the present disclosure to detect an obstacle moving on a target road to be joined by the driving road of a vehicle by changing the sensing range of a sensing unit configured to sense obstacles, when the vehicle traveling on the driving road is anticipated to enter the target road to be joined.

In accordance with an aspect of the present disclosure, the above and other objects can be accomplished by the provision of an obstacle detection system of a vehicle, the obstacle detection system including a driving information unit configured to calculate driving position information of the vehicle, a determiner configured to anticipate whether or not the vehicle will enter a joining point where the vehicle meets a target road to be joined based on the driving position information calculated by the driving information unit, a sensing unit configured to sense obstacles located beside the vehicle, and a controller configured to change a sensing range of the sensing unit so as to detect an obstacle moving on the target road to be joined, when the determiner anticipates that the vehicle will enter the joining point.

The driving information unit may be further configured to calculate information about a driving road of the vehicle and information about the target road to be joined, and the controller may be configured to change the sensing range of the sensing unit based on the information about the driving road of the vehicle and the information about the target road to be joined, calculated by the driving information unit, when the determiner anticipates that the vehicle will enter the joining point.

The determiner may be further configured to calculate a distance from a driving position of the vehicle to the joining point based on the driving position information and the information about the driving road of the vehicle calculated by the driving information unit, and the controller may be further configured to extend the sensing range of the sensing unit based on the distance from the driving position of the vehicle to the joining point, calculated by the determiner.

The driving information unit may be further configured to calculate a lane width of the target road to be joined based on the information about the target road to be joined, calculated by the driving information unit, and the controller may be further configured to extend a lateral width of the sensing range based on the lane width of the target road to be joined, calculated by the driving information unit.

The driving information unit may be further configured to calculate an angle of entry between the driving road of the vehicle and the target road to be joined based on the information about the driving road of the vehicle and the information about the target road to be joined, calculated by the driving information unit, and the controller may be further configured to rotate the sensing range of the sensing unit based on the angle of entry between the driving road of the vehicle and the target road to be joined, calculated by the driving information unit.

The driving information unit may be further configured to calculate moving information of the vehicle, and the controller may be further configured to generate a warning signal based on the moving information of the vehicle and a distance from a driving position of the vehicle to the joining point when the sensing unit detects the obstacle within the changed sensing range.

The driving information unit may be further configured to calculate information about a driving road of the vehicle and information about the target road to be joined, and the determiner may be further configured to anticipate whether or not the vehicle will enter the joining point by comparing a width of the driving road and a width of the target road to be joined, calculated by the driving information unit, with each other.

The controller may be further configured to longitudinally expand the sensing range of the sensing unit with respect to the target road to be joined, when the determiner anticipates that the vehicle will enter the joining point.

In accordance with another aspect of the present disclosure, there is provided an obstacle detection method of a vehicle, the obstacle detection method including calculating, by a driving information unit, driving position information of the vehicle, anticipating, by a determiner, whether or not the vehicle will enter a joining point where the vehicle meets a target road to be joined based on the calculated driving position information, and changing, by a controller, a sensing range of a sensing unit so as to detect an obstacle moving on the target road to be joined in response to the determiner anticipating that the vehicle will enter the joining point.

The obstacle detection method may further include calculating, by the driving information unit, information about a driving road of the vehicle and information about the target road to be joined, and, the determiner may anticipates that the vehicle will enter the joining point, and in the changing of the sensing range, the sensing range may be changed based on the calculated information about the driving road of the vehicle and the calculated information about the target road to be joined.

The obstacle detection method may further include calculating, by the determiner, a distance from a driving position of the vehicle to the joining point based on the calculated information about the driving road of the vehicle and the calculated information about the target road to be joined, and, the changing of the sensing range may include extending, by the controller, the sensing range based on the calculated distance from the driving position of the vehicle to the joining point.

The obstacle detection method may further include calculating, by the driving information unit, a lane width of the target road to be joined based on the calculated information about the target road to be joined and the calculated driving position information, and, the changing of the sensing range may include extending, by the controller, a lateral width of the sensing range based on the calculated lane width of the target road to be joined.

The obstacle detection method may further include calculating, by the driving information unit, an angle of entry between the driving road of the vehicle and the target road to be joined based on the calculated information about the driving road of the vehicle and the calculated information about the target road to be joined, and, the changing of the sensing range may include rotating, by the controller, the sensing range of the sensing unit based on the calculated angle of entry between the driving road of the vehicle and the target road to be joined.

The obstacle detection method may further include calculating, by the driving information unit, moving information of the vehicle, calculating, by the determiner, a distance from a driving position of the vehicle to the joining point based on the calculated information about the driving road of the vehicle and the calculated driving position information, and generating, by the controller, a warning signal based on the calculated moving information of the vehicle and the calculated distance from the driving position of the vehicle to the joining point in response to sensing, by the sensing unit, the obstacle within the changed sensing range.

The determiner may anticipate that the vehicle will enter the joining point, and the changing of the sensing range may include longitudinally extending, by the controller, the sensing range of the sensing unit with respect to the target road to be joined.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
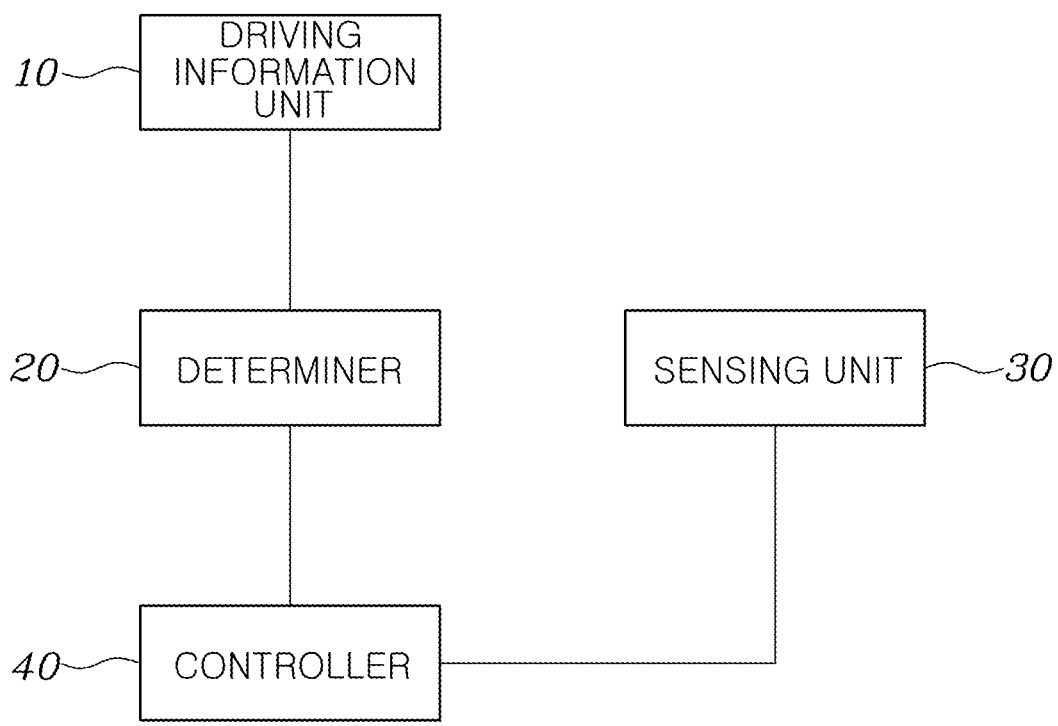
FIG. 1 is a block diagram illustrating an obstacle detection system of a vehicle according to one embodiment of the present disclosure.

Specific structural or functional descriptions in embodiments of the present disclosure set forth in the description which follows will be exemplarily given to describe the embodiments of the present disclosure. However, the present disclosure may be embodied in many alternative forms, and should not be construed as being limited to the embodiments set forth herein.

The embodiments of the present disclosure may be variously modified and changed, and thus specific embodiments of the present disclosure will be illustrated in the drawings and described in detail in the following description of the embodiments of the present disclosure. However, it will be understood that the embodiments of the present disclosure are provided only to completely disclose the disclosure and cover modifications, equivalents or alternatives which come within the scope and technical range of the disclosure.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

The terminology used herein is for the purpose of describing particular embodiments only and is not intended to be limiting. As used herein, singular forms may be intended to include plural forms as well, unless the context clearly indicates otherwise. The terms "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless defined otherwise, all terms including technical and scientific terms used in the following description have the same meanings as those of terms generally understood by those skilled in the art. Terms defined in generally used dictionaries will be interpreted as having meanings coinciding with contextual meanings in the related technology, and are not to be interpreted as having ideal or excessively formal meanings unless defined clearly in the description.

Hereinafter, reference will now be made in detail to the exemplary embodiments of the present disclosure, examples of which are illustrated in the accompanying drawings. Wherever possible, the same reference numbers will be used throughout the drawings to refer to the same or like parts.

A driving information unit 10, a determiner 20, a sensing unit 30 and a controller 40 according to the exemplary embodiments of the present disclosure may be implemented through a non-volatile memory (not shown) configured to store an algorithm configured to control operations of various elements of a vehicle 100 or data regarding software commands for reproducing the algorithm and a processor (not shown) configured to perform operations which will be described below using data stored in the corresponding memory. Here, the memory and the processor may be implemented as individual chips. Alternatively, the memory and the processor may be implemented as a single integrated chip. The processor may be provided in the form of one or more processors.

Figure 2:
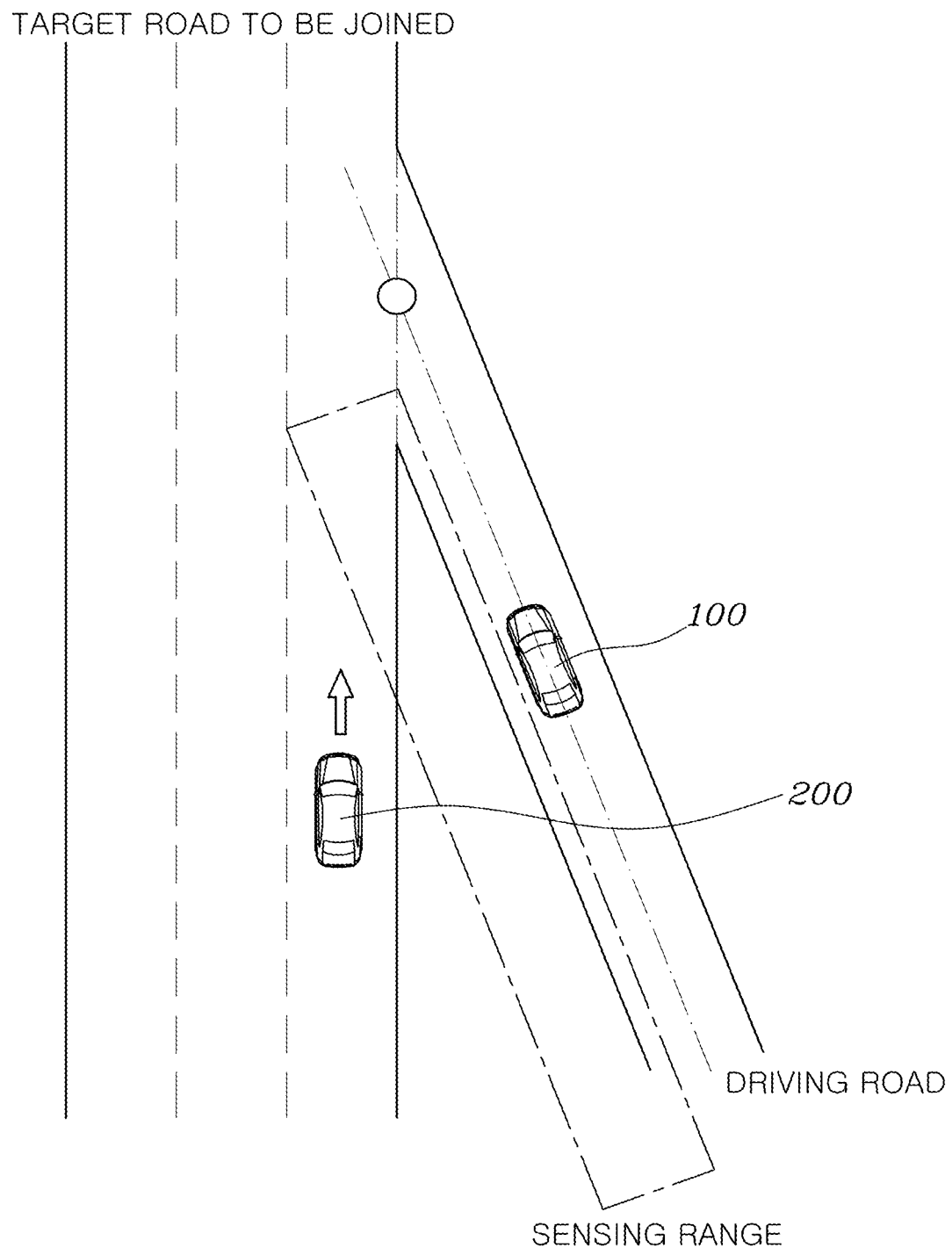
FIGS. 2 and 3 are views illustrating change in the sensing range of the obstacle detection system of the vehicle according to one embodiment of the present disclosure.
Figure 3:
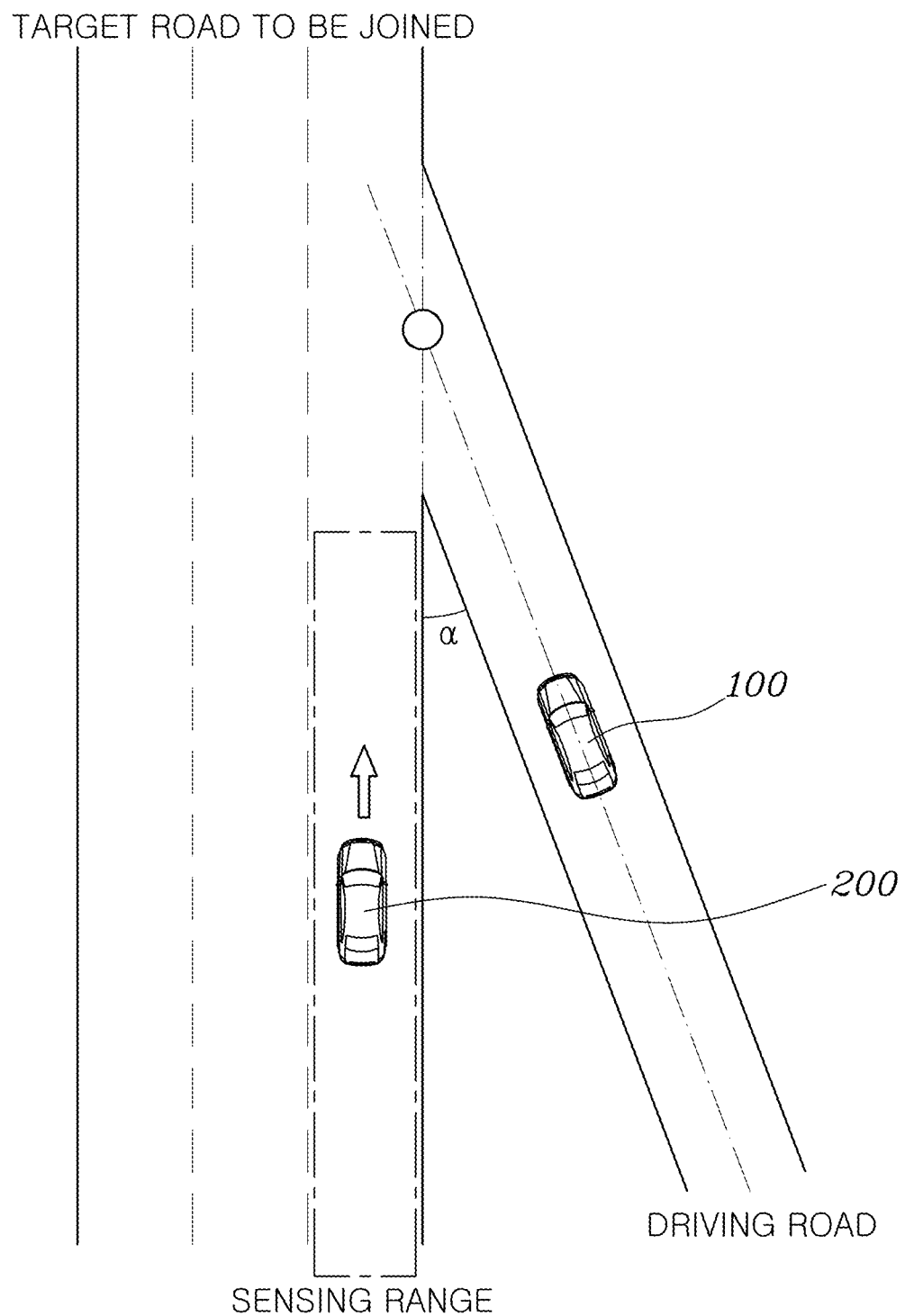

FIG. 1 is a block diagram illustrating an obstacle detection system of the vehicle 100 according to one embodiment of the present disclosure, and FIGS. 2 and 3 are views illustrating change in the sensing range of the obstacle detection system of the vehicle 100 according to one embodiment of the present disclosure.

At a point of an expressway or a highway where a road having a single lane and a road having a plurality of lanes join, the vehicle 100 may collide with an obstacle (or other vehicle) 200 moving on a target road to be joined.

In order to solve such a problem, an object of the present disclosure is to detect the obstacle 200 moving on the target road to be joined by changing the sensing range of the sensing unit 30 provided in the vehicle 100 so as to sense external obstacles, when the vehicle 100 on a driving road is anticipated to enter the target road to be joined.

The obstacle sensing system of the vehicle 100 according to the present disclosure includes the driving information unit 10 configured to calculate driving position information of the vehicle 100, the determiner 20 configured to anticipate whether or not the vehicle 100 will enter a joining point where the vehicle 100 meets a target road to be joined, based on the driving position information calculated by the driving information unit 10, the sensing unit 30 configured to sense obstacles located beside the vehicle 100, and the controller 40 configured to change the sensing range of the sensing unit 30 so as to sense an obstacle 200 moving on the target road to be joined when the determiner 200 anticipates that the vehicle 100 will enter the joining point.

The sensing unit 30 may be connected to a sensor configured to sense an area located at the rear of or beside the vehicle 100, may set the obstacle 200 within a predetermined range to a target, may detect the obstacle 200, and may sense the position, the moving direction and the moving speed of the obstacle 200.

The sensor may be an ultrasonic sensor, a camera sensor, a radar sensor or a lidar sensor mounted on the outer surface of the vehicle 100.

The driving information unit 10 may be connected to a navigation system and a GPS provided in the vehicle 100, may receive road information in a predetermined driving path of the vehicle 100 through information of the driving road on which the vehicle 100 is traveling and the driving path of the vehicle 100, and may calculate position information of the vehicle 100 based on the received road information.

The determiner 20 may predict a time or a distance taken for the vehicle 100 to enter the target road to be joined from the current position of the vehicle 100, when there is a road joining point within the driving path of the vehicle 100 based on the position information of the vehicle 100 received from the driving information unit 10.

When the determiner 20 anticipates that the vehicle 100 will enter the target road to be joined within the predicted time or distance, the controller 40 may change the sensing range of the sensing unit 30 so as to detect the obstacle 200 moving on the target road to be joined.

The conventional sensing unit 30 may detect the obstacle 200 located at the rear side of the vehicle 100, and the controller 40 may extend the sensing range of the sensing unit 30 or move the position of the sensing range of the sensing unit 30 so as to dispose the sensing range of the sensing unit 30 in the target road to be joined.

Thereby, the vehicle 100 may detect the obstacle 200 moving on the target road to be joined at the joining point through the sensing unit 30. When the vehicle 100 detects the obstacle 200 moving on the target road to be joined, the controller 40 may generate a warning signal of the vehicle 100, or may calculate a collision prediction time between the vehicle 100 and the detected obstacle 200 and change the speed of the vehicle 100, in the case in which the vehicle 100 is an autonomous vehicle, thereby being capable of preventing collision between the vehicle 100 and the obstacle 200.

The driving information unit 10 may calculate the information of the driving road on which the vehicle 100 is traveling and the target road to be joined, and the controller 40 may change the sensing range of the sensing unit 30 based on the information of the driving road and the target road to be joined, calculated by the driving information unit 10, when the determiner 20 anticipates that the vehicle 100 will enter the joining point.

The driving information unit 10 may be connected to the navigation system, and may calculate the information of a road on which the vehicle 100 is anticipated to drive through not only the position information of the vehicle 100 but also the driving path of the vehicle 100 input to the navigation system, and the determiner 20 may anticipate that the vehicle 100 will enter the target road to be joined through the calculated information of the road on which the vehicle is anticipated to drive.

Thereby, the controller 30 may change the sensing range of the sensing unit 30 so as to detect the obstacle 200 moving on the target road to be joined, when the determiner 20 anticipates that the vehicle 100 will enter the target road to be joined, thereby being capable of preventing the vehicle 100 at the joining point from colliding with the obstacle 200 moving on the target road to be joined.

According to one embodiment of the present disclosure, the determiner 20 may calculate a distance from the current driving position of the vehicle 100 to the joining point based on the driving road information and the driving position information of the vehicle 100, calculated by the driving information unit 10, and the controller 40 may extend the sensing range of the sensing unit 30 based on the distance from the current driving position of the vehicle 100 to the joining point, calculated by the determiner 20.

The driving information unit 10 may be connected to the navigation system and the GPS, may calculate the current position information of the vehicle 100, and may acquire the information about the current driving road of the vehicle 100 and the information about the target road to be joined through the navigation system, and the determiner 20 may predict the joining point based on the information about the current driving road of the vehicle 100 and the information about the target road to be joined, and may calculate the distance from the current position of the vehicle 100 to the joining point.

As shown in FIG. 2, the controller 40 may extend the longitudinal distance of the sensing range of the sensing unit 20 based on the distance from the current position of the vehicle 100 to the joining point, calculated by the determiner 20. The controller 40 may detect the obstacle 200 moving on the target road to be joined by extending the longitudinal distance of the sensing range of the sensing unit 20 by the distance to the joining point or by changing the longitudinal distance of the sensing range of the sensing unit 20 by adding or subtracting a predetermined distance to or from the distance to the joining point.

Thereby, the longitudinal distance of the sensing range may be extended to a proper length, and thus, the obstacle 200 moving on the target road to be joined may be accurately sensed.

According to another embodiment of the present disclosure, the driving information unit 10 may calculate a lane width of the target road to be joined based on the calculated information about the target road to be joined, and the controller 40 may extend the lateral width of the sensing range based on the lane width calculated by the driving information unit 10.

The driving information unit 10 may acquire the information about the driving road of the vehicle 100 and the information about the target road to be joined through the navigation system connected to the driving information unit 10, and the information about the driving road of the vehicle 100 and the information about the target road to be joined may include the lengths, the numbers of lanes and the widths of the driving road of the vehicle 100 and the target road to be joined.

Thereby, the driving information unit 10 may calculate the lane width by dividing the width of the target road to be joined by the number of lanes, acquired by the driving information unit 10, and the controller 40 may extend the lateral width of the sensing range based on the lane width of the target road to be joined, calculated by the driving information unit 10.

The controller 40 may extend the lateral width of the sensing range by the lane width of the target road to be joined, or may extend the lateral width of the sensing range by a width acquired by adding or subtracting a predetermined value to or from the lane width of the target road to be joined, thereby allowing the obstacle 200 moving on the target road to be joined to be accurately sensed.

The driving information unit 10 may acquire the information about the driving road of the vehicle 100 and the information about the target road to be joined through the navigation system connected to the driving information unit 10, and the information about the driving road of the vehicle 100 and the information about the target road to be joined may include an angle of entry between the driving road of the vehicle 100 and the target road to be joined.

As shown in FIG. 3, the sensing range of the sensing unit 30, which has been already extended, may be rotated by the angle of entry between the driving road of the vehicle 100 and the target road to be joined, thereby allowing the obstacle 200 moving on the target road to be joined to be accurately sensed.

In this embodiment, the operation quantity of the controller 40 is increased, but the obstacle 200 moving on the target road to be joined may be accurately detected by extending the sensing range of the sensing unit 30 by rotating the sensing range by the angle of entry between the driving road of the vehicle 100 and the target road to be joined.

The driving information unit 10 may calculate moving information of the vehicle 100, and the controller 40 may generate a warning signal based on the moving information of the vehicle 100 and the distance from the driving position of the vehicle 100 to the joining point, when the obstacle 200 is sensed within the changed sensing range of the sensing unit 30.

The controller 40 may change the sensing range of the sensing unit 30 so as to allow the vehicle 100 moving on the driving road to detect the obstacle 200 moving on the target road to be joined.

Here, the sensing unit 30 may sense the position and the moving speed of the detected obstacle 200, and the controller 40 may predict whether or not the vehicle 100 will collide with the obstacle 200 by calculating a predetermined arithmetic expression using the driving speed of the vehicle 100, the distance to the joining point acquired by the driving information unit 10, and the position and the moving speed of the obstacle 200.

When the controller 40 predicts that the vehicle will collide with the obstacle 200, the controller 40 may generate a warning signal, or may control driving of the vehicle 100, in the case in which the vehicle 100 is an autonomous vehicle, thereby being capable of avoiding collision between the vehicle 100 and the obstacle 200.

The warning signal may be generated through a warning LED mounted on a cluster provided in the vehicle 100 or a side mirror of the vehicle 100, or the warning signal may be generated through a vibration device of a steering wheel or a warning sound.

The driving information unit 10 may calculate the information about the driving road of the vehicle 100 and the information about the target road to be joined, and the determiner 20 may anticipate that the vehicle 100 will enter the joining point by comparing the calculated width of the driving road of the vehicle 100 and the calculated width of the target road to be joined with each other.

The driving information unit 10 may acquire the information about the driving road of the vehicle 100 and the information about the target road to be joined through the navigation system connected to the driving information unit 10, and the information about the driving road of the vehicle 100 and the information about the target road to be joined may include the lengths and the lane widths of the driving road of the vehicle 100 and the target road to be joined.

The determiner 20 may confirm the joining point where the driving road of the vehicle 100 and the target road to be joined join each other by the width of the driving road of the vehicle 100 and the width of the target road to be joined, calculated by the driving information unit 10, with each other, and may anticipate whether or not the vehicle 100 will enter the target road to be joined.

According to one embodiment of the present disclosure, when the determiner 20 anticipates that the vehicle 100 will enter the target road to be joined, the controller 40 may extend the sensing range of the sensing unit 30 with respect to the target road to be joined in the longitudinal direction.

The sensing range of the conventional sensing unit 30 is set so that the sensing unit 30 may sense obstacles moving at the rear of or beside the vehicle 100.

As shown in FIG. 2, the controller 40 may extend the area of the sensing range of the sensing unit 30 in the longitudinal direction of the vehicle 100, and may thus detect the obstacle 200 moving on the target road to be joined through the longitudinally extended sensing range of the sensing unit 30.

Thereby, the position and the moving speed of the obstacle 200 moving on the target road to be joined may be sensed, and collision between the vehicle 100 and the obstacle 200 may be predicted based on the sensed position and moving speed of the obstacle 200, thus being capable of preventing collision between the vehicle 10 and the obstacle 200.

In this embodiment, the sensing range of the sensing unit 30 is merely extended in the longitudinal direction, and thereby, the obstacle detection system may have a simple configuration and may thus have a low manufacturing cost.

Figure 4:
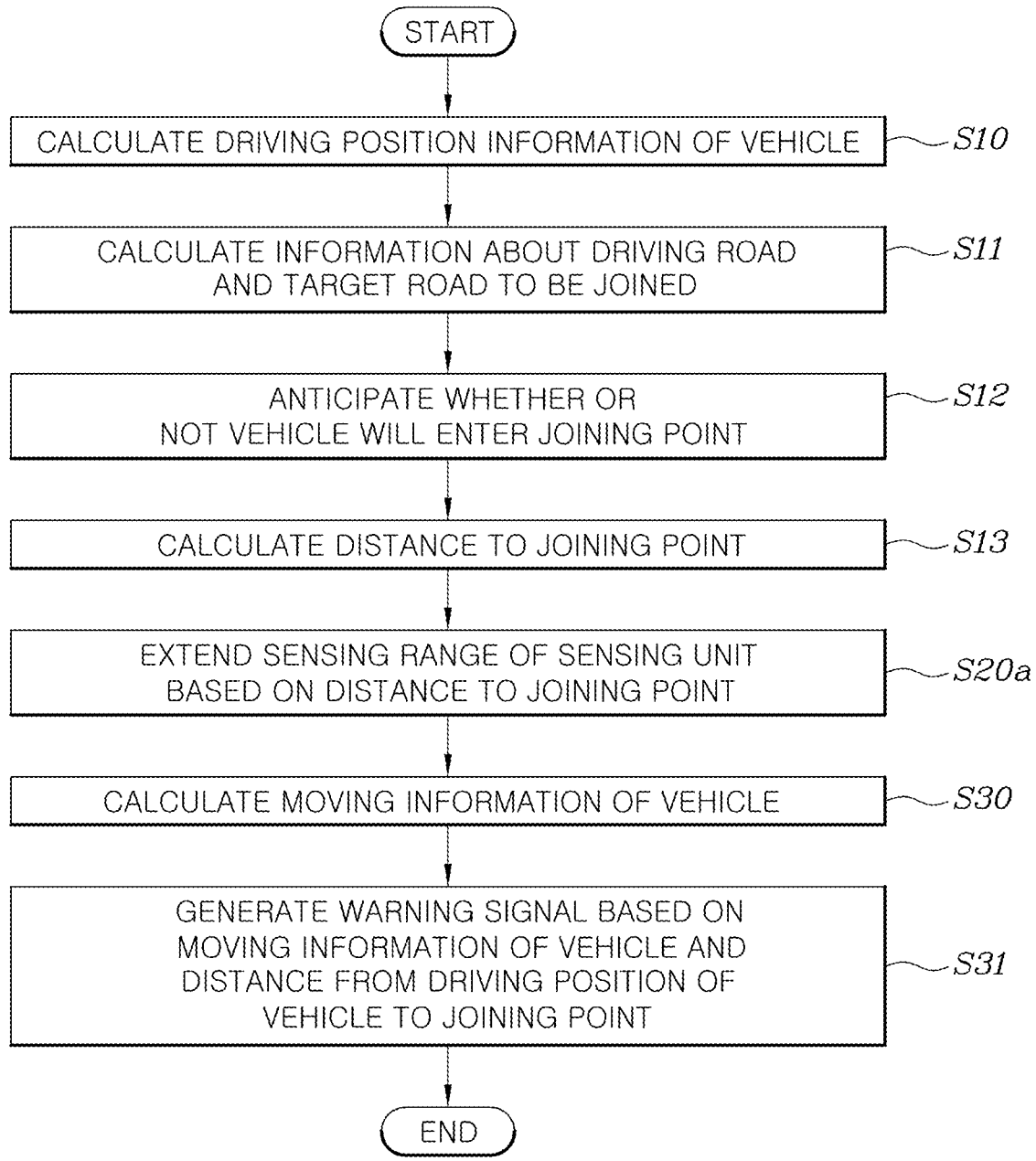
FIGS. 4 to 6 are flowcharts illustrating obstacle detection methods of a vehicle according to various embodiments of the present disclosure.
Figure 5:
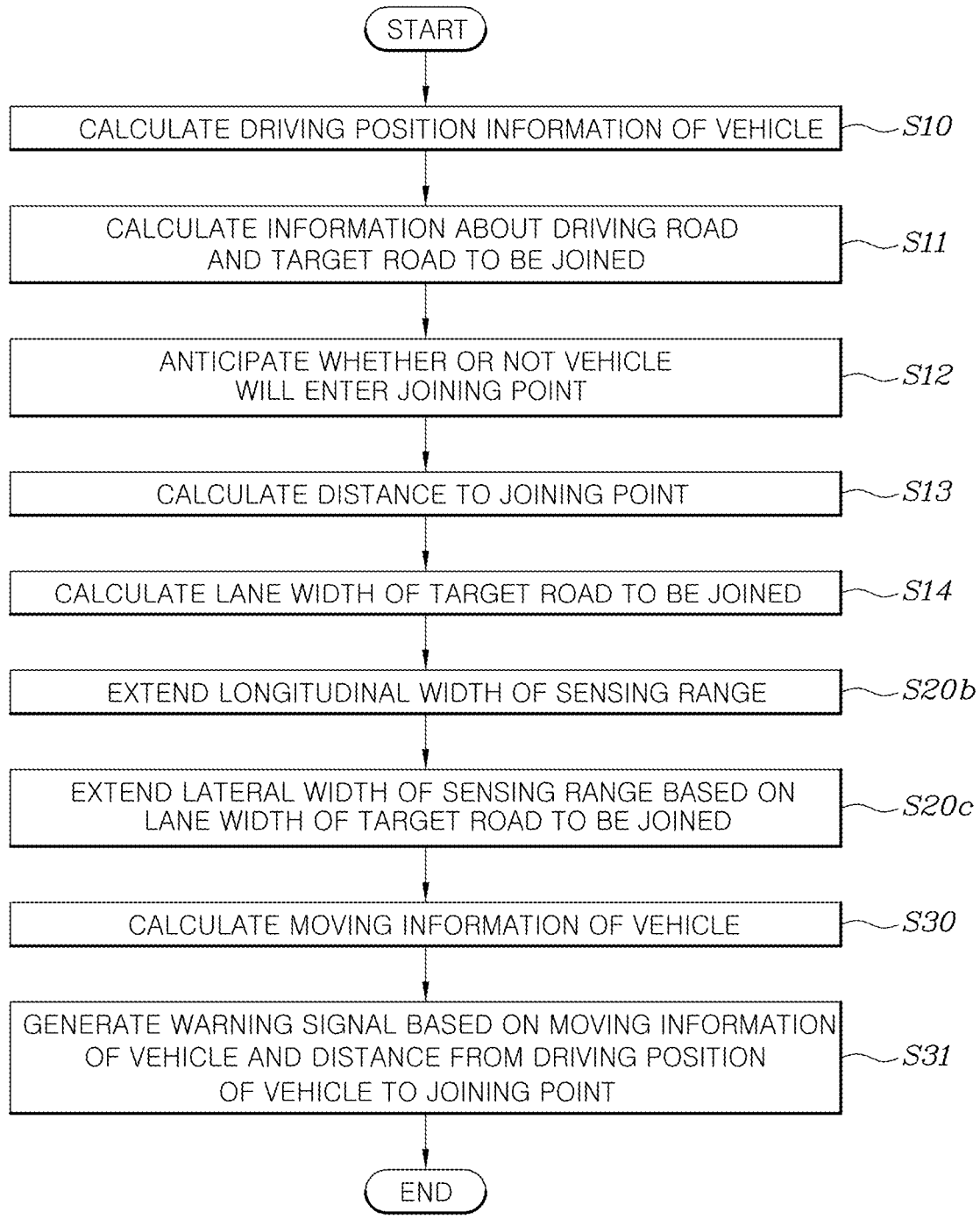
Figure 6:
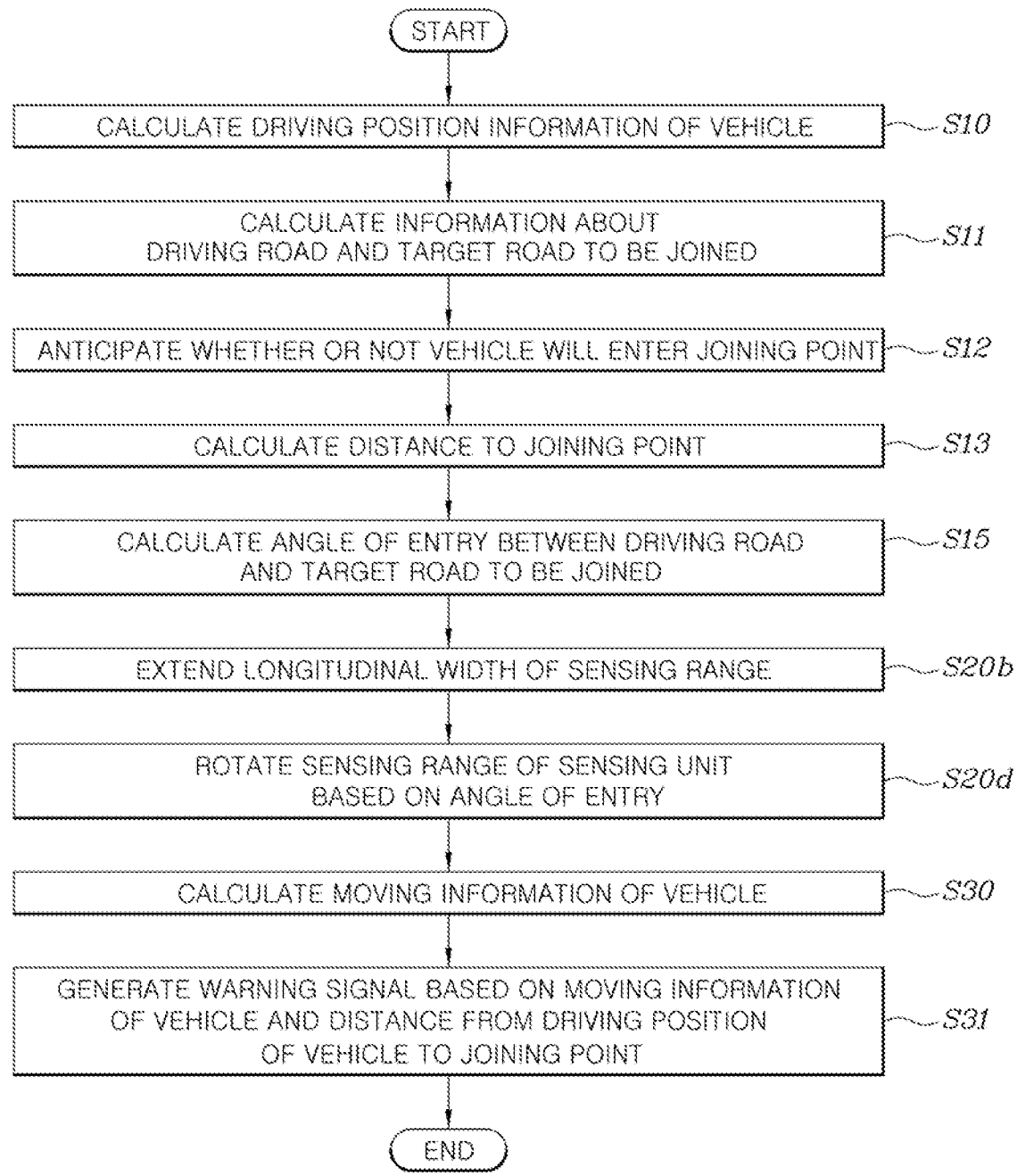

FIGS. 4 to 6 are flowcharts illustrating obstacle detection methods of a vehicle 100 according to various embodiments of the present disclosure.

Referring to FIGS. 4 to 6, the obstacle detection methods of the vehicle 100 according to the exemplary embodiments of the present disclosure will be described.

The obstacle detection method of the vehicle 100 according to the present disclosure includes calculating driving position information of the vehicle (S10), anticipating whether or not the vehicle 100 will enter a joining point where the vehicle meets a target road to be joined based on the driving position information calculated in Operation S10 (S12), and changing the sensing range of the sensing unit 30 so as to detect an obstacle 200 moving on the target road to be joined, when it is anticipated that the vehicle 100 will enter the joining point in Operation S12 (S20).

The obstacle detection method of the vehicle 100 according to the present disclosure may further include calculating information about a driving road on which the vehicle 100 is traveling and information about the target road to be joined (S11) and, when it is anticipated that the vehicle 100 will enter the joining point in Operation S12, the sensing range of the sensing unit 30 may be changed based on the information about the driving road and the information about the target road to be joined, calculated in Operation S11 (S20).

The obstacle detection method of the vehicle 100 according to the present disclosure may further include calculating a distance from the driving position of the vehicle 100 to the joining point based on the information about the driving road of the vehicle 100, calculated in Operation S11, and the driving position information (S13) and, in the Operation S20 of changing the sensing range of the sensing unit 30, the sensing range of the sensing unit 30 may be extended based on the distance from the driving position of the vehicle 100 to the joining point, calculated in Operation S13 (S20a).

Alternatively, the obstacle detection method of the vehicle 100 according to the present disclosure may further include calculating the lane width of the target road to be joined based on the information about the driving road of the vehicle 100 and the information about the target road to be joined, calculated in Operation S11, and the driving position information (S14) and, in the Operation S20 of changing the sensing range of the sensing unit 30, the lateral width of the sensing range of the sensing unit 30 may be extended based on the lane width of the target road to be joined, calculated in Operation S14 (S20c).

Otherwise, the obstacle detection method of the vehicle 100 according to the present disclosure may further include calculating an angle of entry between the driving road of the vehicle 100 and the target road to be joined based on the information about the driving road of the vehicle 100 and the information about the target road to be joined, calculated in Operation S11 (S15) and, in the Operation S20 of changing the sensing range of the sensing unit 30, the sensing range of the sensing unit 30 may be changed based on the angle of entry between the driving road of the vehicle 100 and the target road to be joined, calculated in Operation S15 (S20d).

The obstacle detection method of the vehicle 100 according to the present disclosure may further include calculating moving information of the vehicle (S30), calculating the distance from the driving position of the vehicle 100 to the joining point based on the information about the driving road of the vehicle 100, calculated in Operation S11, and generating a warning signal based on the moving information of the vehicle 100 and the distance from the driving position of the vehicle 100 to the joining section, when an obstacle 200 within the changed sensing range is detected (S31).

In the Operation S20 of changing the sensing range of the sensing unit 30, the sensing range of the sensing unit 30 with respect to the target road to be joined may be expanded in the longitudinal direction (S20b), when it is anticipated that the vehicle 100 will enter the target road to be joined at the joining point in Operation 12.

As is apparent from the above description, an obstacle sensing system of a vehicle according to the present disclosure anticipates whether or not the vehicle will enter a target road to be joined from the driving road of the vehicle, and changes the sensing range of a sensor unit configured to detect obstacles located at the rear of or beside the vehicle based on a result of anticipation, thereby being capable of detecting an obstacle moving on the target road to be joined, and giving warning to a driver or controlling the vehicle so as to prevent collision between the vehicle and the obstacle.

Further, the extended sensing range of the sensing unit may be rotated by an angle of entry at which the driving road joins the target road to be joined, thereby allowing the sensing unit to accurately detect the obstacle moving on the target road to be joined.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An obstacle detection system of a vehicle, the obstacle detection system comprising: a driving information unit configured to calculate driving position information of the vehicle; a determiner configured to anticipate whether the vehicle will enter a joining point where the vehicle meets a target road to be joined based on the driving position information calculated by the driving information unit; a sensing unit configured to sense obstacles located beside the vehicle; and a controller configured to change a sensing range of the sensing unit so as to detect an obstacle moving on the target road to be joined, in response that the determiner anticipates that the vehicle will enter the joining point, wherein the driving information unit is further configured to calculate a lane width of the target road to be joined based on information about the target road to be joined, calculated by the driving information unit, and wherein the controller is further configured to extend a lateral width of the sensing range based on the lane width of the target road to be joined, calculated by the driving information unit.

2. The obstacle detection system according to claim 1, wherein: the driving information unit is further configured to calculate information about a driving road of the vehicle and the information about the target road to be joined; and the controller is configured to change the sensing range of the sensing unit based on the information about the driving road of the vehicle and the information about the target road to be joined, calculated by the driving information unit, when the determiner anticipates that the vehicle will enter the joining point.

3. The obstacle detection system according to claim 2, wherein: the determiner is further configured to calculate a distance from a driving position of the vehicle to the joining point based on the driving position information and the information about the driving road of the vehicle calculated by the driving information unit; and the controller is further configured to extend the sensing range of the sensing unit based on the distance from the driving position of the vehicle to the joining point, calculated by the determiner.

4. The obstacle detection system according to claim 2, wherein: the driving information unit is further configured to calculate an angle of entry between the driving road of the vehicle and the target road to be joined based on the information about the driving road of the vehicle and the information about the target road to be joined, calculated by the driving information unit; and the controller is further configured to rotate the sensing range of the sensing unit based on the angle of entry between the driving road of the vehicle and the target road to be joined, calculated by the driving information unit.

5. The obstacle detection system according to claim 1, wherein: the driving information unit is further configured to calculate moving information of the vehicle; and the controller is further configured to generate a warning signal based on the moving information of the vehicle and a distance from a driving position of the vehicle to the joining point when the sensing unit detects the obstacle within the changed sensing range.

6. The obstacle detection system according to claim 1, wherein: the driving information unit is further configured to calculate information about a driving road of the vehicle and the information about the target road to be joined; and the determiner is configured to anticipate whether or not the vehicle will enter the joining point by comparing a width of the driving road and a width of the target road to be joined, calculated by the driving information unit, with each other.

7. The obstacle detection system according to claim 1, wherein: the controller is further configured to longitudinally expand the sensing range of the sensing unit with respect to the target road to be joined, when the determiner anticipates that the vehicle will enter the joining point.

8. An obstacle detection method of a vehicle, the obstacle detection method comprising: calculating, by a driving information unit, driving position information of the vehicle; anticipating, by a determiner, whether the vehicle will enter a joining point where the vehicle meets a target road to be joined based on the calculated driving position information; and changing, by a controller, a sensing range of a sensing unit so as to detect an obstacle moving on the target road to be joined in response to the determiner anticipating that the vehicle will enter the joining point, wherein the obstacle detection method further comprising: calculating, by the driving information unit, a lane width of the target road to be joined based on information about the target road to be joined and driving position information, wherein, the changing of the sensing range includes extending, by the controller, a lateral width of the sensing range based on the calculated lane width of the target road to be joined.

9. The obstacle detection method according to claim 8, further comprising calculating, by the driving information unit, information about a driving road of the vehicle and the information about the target road to be joined, wherein, the determiner anticipates that the vehicle will enter the joining point, and in the changing of the sensing range, the sensing range is changed based on the calculated information about the driving road of the vehicle and the calculated information about the target road to be joined.

10. The obstacle detection method according to claim 9, further comprising calculating, by the determiner, a distance from a driving position of the vehicle to the joining point based on the calculated information about the driving road of the vehicle and the calculated information about the target road to be joined, wherein, the changing of the sensing range includes extending, by the controller, the sensing range based on the calculated distance from the driving position of the vehicle to the joining point.

11. The obstacle detection method according to claim 9, further comprising calculating, by the driving information unit, an angle of entry between the driving road of the vehicle and the target road to be joined based on the calculated information about the driving road of the vehicle and the calculated information about the target road to be joined, wherein, the changing of the sensing range includes rotating, by the controller, the sensing range of the sensing unit based on the calculated angle of entry between the driving road of the vehicle and the target road to be joined.

12. The obstacle detection method according to claim 9, further comprising: calculating, by the driving information unit, moving information of the vehicle; calculating, by the determiner, a distance from a driving position of the vehicle to the joining point based on the calculated information about the driving road of the vehicle and the calculated driving position information; and generating, by the controller, a warning signal based on the calculated moving information of the vehicle and the calculated distance from the driving position of the vehicle to the joining point in response to sensing, by the sensing unit, the obstacle within the changed sensing range.

13. The obstacle detection method according to claim 8, wherein, the determiner anticipates that the vehicle will enter the joining point, and the changing of the sensing range includes longitudinally extending, by the controller, the sensing range of the sensing unit with respect to the target road to be joined.

* * * * *